United States Patent

Ivers et al.

[15] 3,641,565

[45] Feb. 8, 1972

[54] DIGITAL RESOLVER

[72] Inventors: Richard J. Ivers, Arlington; William H. McDonough, Acton, both of Mass.

[73] Assignee: Dynamics Research Corporation, Wilmington, Mass.

[22] Filed: Sept. 2, 1969

[21] Appl. No.: 854,658

[52] U.S. Cl. ........................................340/347 SY, 235/154

[51] Int. Cl. ........................................H03k 13/02

[58] Field of Search ........................340/347; 235/154, 150.5

[56] References Cited

UNITED STATES PATENTS

| | | | |
|---|---|---|---|
| 2,947,929 | 8/1960 | Bower | 340/347 X |
| 3,071,324 | 1/1963 | Schroeder et al. | 235/154 |
| 3,142,834 | 7/1964 | Falk et al. | 340/347 |
| 3,247,507 | 4/1966 | Moses | 340/347 |
| 2,989,741 | 6/1961 | Gordon et al. | 340/347 |
| 3,298,019 | 1/1967 | Nossen | 340/347 |
| 3,315,253 | 4/1967 | Geller | 340/347 |

*Primary Examiner*—Thomas A. Robinson
*Assistant Examiner*—Jeremiah Glassman
*Attorney*—Weingarten, Maxham & Schurgin

[57] ABSTRACT

A digital system for providing precise high-resolution angular data directly from analog input signals. Quadrature-phased input signals are processed to provide an error signal which is employed to control a digital feedback loop operative to generate a digital output signal representative of input angular data.

6 Claims, 6 Drawing Figures

RICHARD J. IVERS
WILLIAM H. McDONOUGH
INVENTORS

BY Joseph Weingarten
Stanley M. Schwarz
ATTORNEYS

RICHARD J. IVERS
WILLIAM H. McDONOUGH
INVENTORS

BY Joseph Weingarten
Stanley M. Schurgin
ATTORNEYS

DIGITAL RESOLVER

FIELD OF THE INVENTION

This invention relates to angle resolvers and more particularly to electronic digital resolvers capable of extremely accurate high-resolution operation.

BACKGROUND OF THE INVENTION

Electrical optical shaft encoders are often employed to indicate the angular position of a rotatable shaft by providing electrical output signals which essentially are the sine and cosine function of the mechanical angle of the input shaft. These quadrature-phased sine and cosine signals are then processes to provide an indication of the extend and sense of input shaft movement. Conventionally, the quadrature-phased analog signals are processed by a zero crossing detector which provides pulses corresponding in time to the traversal by the sinusoidal signal of a zero reference threshold. Signal processing is accomplished in an analog manner, with a result that DC instability of the sinusoidal waves can cause a corresponding error to appear in the output pulse train. Angle measurements derived from the pulse train are therefore subject to error. Pulse interpolation techniques are generally employed to increase the resolution of the encoder. However, such techniques also suffer the disadvantages occasioned by inaccuracies in the generated pulse train. Moreover, error can also occur from instabilities in the analog interpolation processing. There is also a practical limit to the degree of resolution enhancement which can be achieved by pulse interpolation since system complexity increases markedly with the degree of resolution desired.

SUMMARY OF THE INVENTION

In accordance with the present invention, a system is provided in which precise high-resolution angle information is produced directly from analog input quadrature-phased signals. Signal processing is accomplished in a wholly digital manner, and, by use of the invention, system resolution is increased markedly over that practically achievable by conventional processing techniques. The invention is particularly useful to process sine and cosine output signals of an electro-optical encoder to provide an extremely high-resolution output indication of encoder position. However, the system is also broadly useful to process any pair of quadrature-phased sinusoidal signals, such as produced by function generators, electromechanical synchros, or sine or cosine potentiometers.

Briefly, sine and cosine input signals are each multiplied by a digital representation of stored angular data, and the resulting signals are subtracted from one another to provide an error signal which is employed to control a digital feedback loop such that a digital output signal is provided, representative of input angular data. The feedback loop includes a memory for storing angular data, and an up-down counter operative to address the memory. A digitized version of the error signal is employed to control operation of the up-down counter, the output count of which is employed to address the memory. In effect, the digital feedback loop operates as a digital servo, such that the loop is driven to an address position for which the error signal is effectively zero, this memory address being representative of the angle desired.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
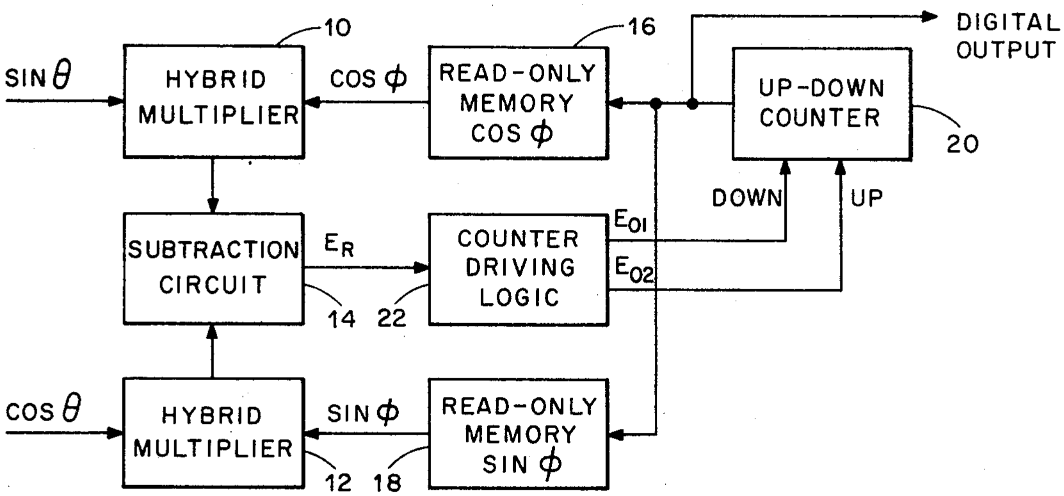
FIG. 1 is a block diagram of a system embodying the invention.

A system embodying the invention and capable of providing a high-resolution digital output representative of the magnitude of an input angle is shown in FIG. 1. The input signals to the system are first and second analog signals respectively representing the sine and the cosine of an angle $\theta$, where $\theta$ is an angle to be determined. The sine $\theta$ input signal is applied to one input of a hybrid multiplier 10, the other input of which is a digital version of cosine $\phi$, which is derived from memory storage in a manner to be described hereinbelow. The cosine $\theta$ input is applied to a hybrid multiplier 12, the second input of which is a digitized version of sine $\phi$, similarly derived from memory storage, as will be described. The hybrid multipliers 10 and 12, typically, can be multiplying analog-to-digital converters, well known in the art. The output signal of multipliers 10 and 12 are analog signals which are applied to subtraction circuit 14, the output of which is an error signal $E_R$ which is defined mathematically as follows:

$$E_R=E_M[\sin\theta\cos\phi-\cos\theta\sin\phi]$$

where $E_M$ is the peak voltage of the analog input signals.

The above mathematical expression can be reduced to the form $E_R=E_M\sin(\theta-\phi)$.

The memories 16 and 18 are typically integrated circuit read-only memories, and each consists of two single quadrant sine memories from which full cycle sin and cosine information is derived, in a manner to be described hereinbelow. Memory 16 is operative to provide a digital representation of cosine $\phi$ to multiplier 10, while memory 18 is operative to provide a digital representation of sine $\phi$ to multiplier 12. Both memories are addressed and are under the control of an up-down counter 20, which, in turn, is driven by counter driving logic 22 operative in response to the error signal $E_R$ produced by subtraction circuit 14.

The error signal causes counter driving logic 22 to activate counter 20 to provide a sequence of addresses for memories 16 and 18, the memories producing respective values of cos $\phi$ and sin $\phi$ until the error signal is reduced to a predetermined minimum level, approximately zero. At this minimum level, the stored cosine and sine data is substantially equal to the input sine and cosine data, and the address of this stored data is the intended input angle $\theta$. It is evident that memories 16 and 18, counter 20, and logic 22 are arranged in a digital servo loop driven such that a memory address location is derived for which the error signal is minimal. This address is a digitized version of angle $\theta$ and provides the digital output of the system. For an error signal $E_R$ which is substantially zero, the angle $\theta$ equals the angle $\phi$, and the output signals of memories 16 and 18 are equal to cosine $\theta$ and sine $\theta$, respectively, and such trigonometric values are also available as system outputs as may be required in particular instances. Thus, the system, according to the invention, readily provides a digital output representing the angle $\theta$ as well as the sine and cosine of angle $\theta$, and this angular information is provided with very high resolution and precision.

Figures 2, 3, 4, 5:
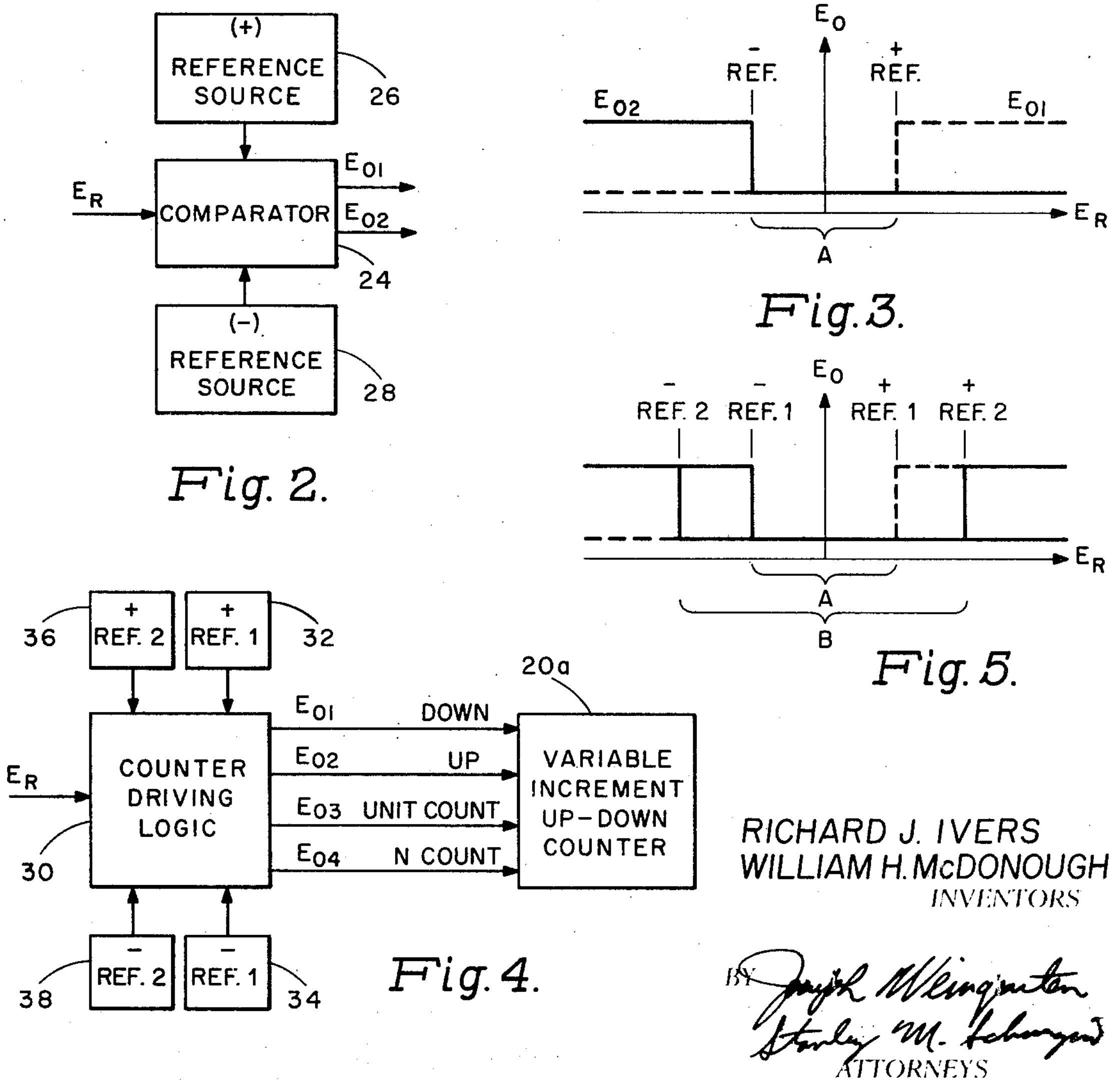
FIG. 2 is a diagrammatic representation of the counter driving logic employed in FIG. 1.
FIG. 3 is a voltage plot useful in illustrating the operation of the circuitry of FIG. 2.
FIG. 4 is a diagrammatic representation of an alternative embodiment of the counter driving logic of FIG. 1.
FIG. 5 is a voltage plot useful in illustrating the operation of the circuitry of FIG. 4.

Counter driving logic 22 is operative to drive counter 20 either higher or lower in count to arrive at a null position at which the error signal $E_R$ is effectively zero. One embodiment of logic circuitry operative to provide the intended loop control is illustrated in FIG. 2 and includes a comparator 24 having a positive reference source 26 and a negative reference source 28. The error signal $E_R$ is applied to the input of comparator 24, and first and second outputs are provided, an up-control line being labeled $E_{02}$ and a down-control line being labeled $E_{01}$.

Circuit operation is best explained with the aid of FIG. 3 which depicts the output voltage conditions which are dependent upon the relative error voltage $E_R$ and the reference voltages employed to achieve system operation. The reference voltages +Ref and −Ref are symmetrically spaced about a nominal voltage $E_0$. When the error voltage $E_R$ is greater than the voltage of positive reference source 26 (+Ref), the comparator output $E_{01}$ enables the down-count input of counter 20. When $E_R$ is greater than the voltage of the negative reference source 28 (−Ref), the comparator output $E_{02}$ is operative to enable the up-count input of counter 20. When $E_R$ is within the voltage range A defined by the positive and negative reference sources 26 and 28, the comparator output is approximately zero on both output lines $E_{01}$ and $E_{02}$, with a result that counter 20 remains in a static mode to provide an output signal representative of the count then present in the counter. The count provided in this static mode is the address of memories 16 and 18 which is also the digitized output angle $\theta$. Comparator 24 typically can be an operational amplifier operating in saturation such that two level operation is achieved. A substantially constant output signal $E_{01}$ or $E_{02}$ is provided to drive counter 20 selectively up or down. In addition, when the relative magnitudes of the error signal and the reference voltages are within the predetermined range, the comparator output is essentially zero, with a result that counter 20 is not driven further and retains the count accumulated to that point.

Up-down counter 20 is a well known incremental counter which counts at a rate determined by a clocking source associated therewith, one increment each clock pulse. When the system according to the invention is initially energized, the input angular data may be at any arbitrary value, while the stored angular data similarly can be at any arbitrary angle $\phi$. The system is operative to arrive at a stable loop condition such that a zero error signal is obtained.

It will be evident that the duration of counter operation is dependent upon the magnitude of the error signal which must be diminished to an essentially zero value. In some instances, it may be desirable to increase the operating speed of the system so that nulling of the digital loop can be accomplished in minimal time even for error signals of large magnitude. An embodiment of counter driving logic operative to provide such enhanced operating speed for large error signals is illustrated in FIG. 4. Logic 30 includes two pairs of reference sources, sources 32 and 34 respectively providing a first positive and negative reference voltage, while sources 36 and 38 respectively provide a second positive and negative reference voltage. First and second output lines, respectively labeled $E_{01}$ and $E_{02}$, are applied to the down and up control inputs of counter 20*a* as described above. The counter in this instance is a variable increment up-down counter operative to count at a unit rate or at a higher rate which is a multiple of the unit rate. Logic 30 includes a third and a fourth output line, designated $E_{03}$ and $E_{04}$, respectively, these output lines being applied to the unit count input of counter 20*a* and the N count input respectively.

When the unit count input is activated, counter 20*a* is operative to count at the incremental rate determined by the clock rate. When, however, the N count input is activated, the counter operates at N times the clock rate with the result that N-counts are provided for each clock pulse. Operation of the circuitry of FIG. 4 is best explained with reference to FIG. 5 which depicts the relative reference and error voltages employed to effect respective system output conditions. Referring to FIG. 5, it is evident that the first reference sources 32 and 34 define a first voltage range A symmetrically arranged about a nominal voltage $E_0$. In like manner, the second reference sources 36 and 38 define a second wider voltage range B also symmetrically disposed about the voltage $E_0$. When the error voltage $E_R$ is greater than the magnitude of the voltage of source 36 or 38 (outside of voltage range B), the output line $E_{04}$ is activated by logic 30, causing the N count input of counter 28 to be enabled. Output lines $E_{01}$ or $E_{02}$ are also selectively activated in this instance, depending upon the polarity of the error signal, to appropriately drive the counter either up or down at a rate of N-counts for each clock pulse increment, to rapidly slew through a counting sequence.

When the magnitude of the error signal is within the voltage range B defined by the reference sources 36 and 38, output line $E_{03}$ is activated causing counter 20 *a* to increment at the unit rate determined by the associated clocking source. It will be appreciated that during this mode of operation, one of the output lines $E_{01}$ or $E_{02}$ is also actuated to selectively drive counter 20*a* either up or down depending upon the sense of the error voltage. When the magnitude of the error signal is within the voltage range A defined by reference sources 32 and 34, the comparator output is essentially zero, causing counter 20*a* to cease counting and retain the count accumulated thus far. By operation of the variable increment circuitry of FIG. 4, the system is capable of providing digital output in a minimum amount of time since, for larger magnitudes of error signal, the digital loop operation is accomplished at a faster rate to enable more rapid nulling of the loop and consequent generation of a digital output signal.

Figure 6:
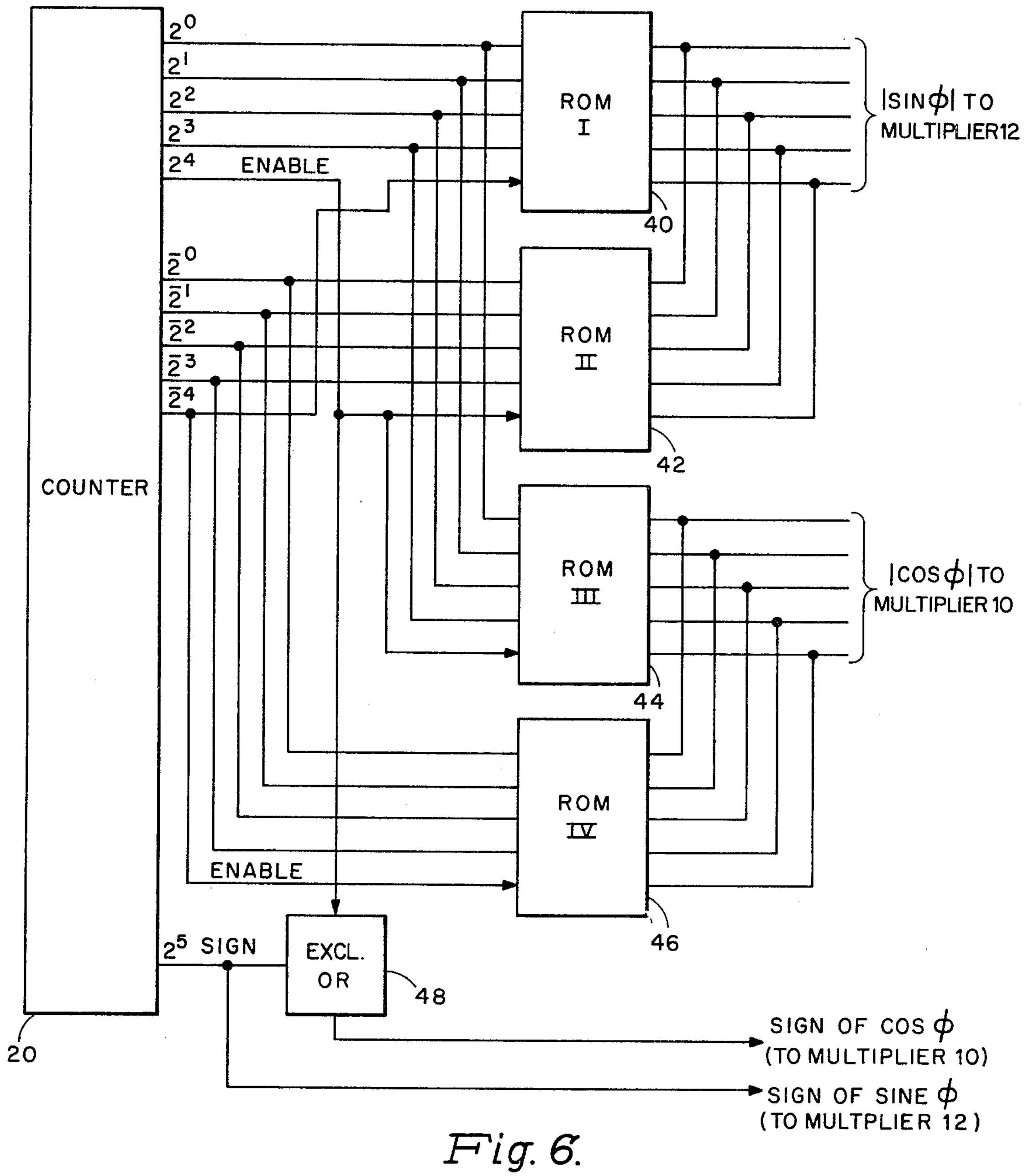
FIG. 6 is a block diagram of the read-only memories of FIG. 1.

It is a particular feature of the invention that only single quadrant sine information is stored in memory and full cycle sine and cosine data are uniquely derived from the single quadrant stored data. The memory system 16 and 18 of FIG. 1 is illustrated in greater detail in FIG. 6 and includes four read-only memory units 40, 42, 44, and 46, respectively. Each memory unit is capable of storing 16 words representing the sine of angles in a single quadrant, that is, the sine of angles between 0° and 90° in evenly spaced increments of 5.625°. According to this invention, memory units 40–46 are selectively addressed, and their outputs are operative to provide angular information representing the sine and cosine of all angles between 0° and 360°.

Counter 20 has a six-bit output format and also has six complementary outputs. The output bits are labeled in conventional fashion from $2^0$ through $2^5$ while the complementary outputs are labeled by the complementary notation indicated $\overline{2^0}$ through $\overline{2^5}$. In the illustrated embodiment, the complementary $\overline{2^5}$ output is not employed and is not illustrated. The $2^0$ through $2^3$ outputs of counter 20 are connected to the four-bit input of memory unit 40 and memory unit 44. The complementary outputs $\overline{2^0}$ through $\overline{2^3}$ of counter 20 are connected to the inputs of memory unit 42 and memory unit 46. The $2^4$ output is connected to the enable input of memory units 42 and 44, while the complementary $\overline{2^4}$ output is connected to the enable input of memory units 40 and 46. The $2^4$ output of counter 20 is applied to an EXCLUSIVE OR circuit 48, the second input of which is the $2^5$ output of counter 20. The output of EXCLUSIVE OR circuit 48 provides an output signal indicative of the sign of cosine $\phi$. An output signal is derived directly from the $2^5$ output of counter 20 and provides an output signal indicative of the sign of sine $\phi$.

Each memory unit has a five-bit output format, and the output lines of memory units 40 and 42 are paralleled to provide a five-bit output word representative of the magnitude of sine $\phi$, while the output lines of memory units 44 and 46 are similarly paralleled to provide a five-bit output word representing the magnitude of cosine $\phi$. The sine $\phi$ and cosine $\phi$ output words are applied respectively to multiplier 12 and multiplier 10 for use in the loop operation, as described above. The address positions of each quadrant are uniquely related to address positions in adjacent quadrants with the result that full cycle sine and cosine information is expeditiously derived from single quadrant stored data. Each memory unit is operative only when enabled by a signal applied to the respective enable input of each unit. Thus, memory unit 40 is enabled by the complementary $\overline{2^4}$ output of counter 20, which, of course, denotes that the $2^4$ output of counter 20 is at a 0 binary value. Memory unit 42 and memory unit 44 are both enabled when the $2^4$ counter output is on. Memory unit 46 is enabled by a signal from the complementary $\overline{2^4}$ output, which occurs when the $2^4$ counter output is not active.

The most significant bit position, that is, the $2^5$ bit, provides sign indication while the $2^4$ bit provides quadrant information. The remaining bit positions $2^3$ to $2^0$ define the binary representation of sine $\phi$. According to the data format employed in the illustrated embodiment, a logical zero in bit position $2^5$ denotes a positive sign (+) while a logical one denotes a negative sign (−). A logical zero in bit position $2^4$ denotes an even quadrant (2 or 4 ) while a logical one in bit position $2^4$ denotes an odd quadrant ( 1 or 3 ). It will be appreciated that the sine of an angle plus 90° equals the cosine of that angle; thus, the presence of a logical one in the $2^4$ bit position designates cosine $\phi$ rather than sine $\phi$. The presence of a logical one in bit position $2^5$ also indicates an angle greater than 180° while the presence of a logical zero in this bit position indicates an angle less than 180°.

The sign of cosine $\phi$ and sign of sine $\phi$ are applied respectively to multipliers 10 and 12 and specifically to inversion circuitry associated therewith so that positive signal values are employed in the multiplication process.

Thus, it will be appreciated that the invention provides a digital system operative to provide high-resolution angular data in an extremely efficient manner. The unique digital processing afforded by the invention is not subject to the instabilities of analog systems and can provide very high resolution with relatively simple circuitry.

What is claimed is:

1. A digital resolver for providing digital representation of an angle from quadrature-phased first and second trigonometric functions of said angle, said resolver comprising:

memory means operative to provide first and second digital output signals in response to a digital input signal with the first and second digital output signals being digital representations of quadrature-phase trigonometric functions of the digital input signal;

means for receiving said first and second quadrature-phased signals representative of trigonometric functions of said angle;

means for combining said first and second quadrature-phased, received signals and said first and second quadrature-phased output signals to provide an error signal representative of the difference between the value of the angle represented by said received signals and the value represented by said output signals; and means for altering the input digital signal for said memory means in response to said error signal to cause said error signal to approach a predetermined signal level;

the value of the input digital signal for said memory means being representative of said angle.

2. The digital resolver of claim 1 wherein said memory means comprises:

a first read-only memory system providing, as one of said digital output signals, a signal representative of the cosine of the digital input signal for said memory means; and a second read-only memory system providing as the other of said digital output signals, or signal representative of the trigonometric sine function of the digital input signal for said memory means.

3. The digital resolver of claim 1 wherein said means for altering said digital input signal of said memory means comprises:

an up-down digital counter having its digital count applied to said memory means as input and operative to count up in response to a first signal and operative to count down in response to a second signal; and means for generating said first signal whenever said error signal exceeds it predetermined level by a preset value; and means for generating said second signal whenever said predetermined level exceeds said error signal by a preset value.

4. The digital resolver according to claim 3 wherein said memory means includes:

four memory units each storing a plurality of data words representing the sines of angles in a single quadrant;

means selectively coupling the output of said counter to the inputs of said memory units;

means for coupling the outputs of said first and second memory units in parallel;

means for coupling the outputs of said third and fourth memory units in parallel;

said counter being selectively coupled to said first and second memory units to provide an output signal representative of the sine of an angle between 0 and 360°;

said counter being selectively coupled to said third and fourth memory units to provide an output signal representative of the cosine of an angle between 0° and 360°; and means for deriving an output from said counter representative of the sign of said cosine and sine data provided by said memory units.

5. The digital resolver of claim 1 wherein said combining means comprises:

a first multiplying analog-to-digital converter having one of said received, quadrature-phased input signals applied to an analog input thereof and one of said digital output signals from said memory means applied to a digital input thereof;

a second multiplying analog-to-digital converter having the other of said received, quadrature-phased input signals on an analog input thereof and the other of said digital output signals from said memory means on a digital input thereof; and means for differencing the outputs of said first and second multiplying converters to provide said error signal;

each of said multiplying converters having its input signals quadrature-phased.

6. The digital resolver according to claim 1 wherein said input digital signal altering means includes:

a digital up-down counter operative to provide its digital count as the digital input signal to said memory means;

positive and negative first reference signal sources;

positive and negative second reference signal sources; and logic circuitry coupled to said reference signal sources operative in response to said error signal to provide a first control signal when the level of said error signal is greater than the level of said first positive reference signal, to provide a second control signal when the level of said error signal is less than the level of said first negative reference signal, to provide a third control signal when the level of said error signal is intermediate the levels of said second reference signals, and to provide a fourth control signal when the level of said error signal is outside a range of signal levels between said second reference signals;

said up-down counter being operative to count up in response to said first signal and to count down in response to said second signal;

said up-down counter being further operative to alter in response to said third control signal its digital output in digital steps of a first predetermined size and being operative in response to said fourth signal to alter its digital output in digital steps of a second predetermined size.

* * * * *